US010566747B2

(12) United States Patent
Thompson

(10) Patent No.: US 10,566,747 B2
(45) Date of Patent: Feb. 18, 2020

(54) TELECOMMUNICATIONS ASSEMBLY WITH PATCH CORD STORAGE

(71) Applicant: CommScope Technologies LLC, Hickory, NC (US)

(72) Inventor: Patrick J. Thompson, Prior Lake, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/397,500

(22) Filed: Apr. 29, 2019

(65) Prior Publication Data

US 2019/0319412 A1     Oct. 17, 2019

Related U.S. Application Data

(63) Continuation of application No. 14/201,147, filed on Mar. 7, 2014, now Pat. No. 10,276,990.

(60) Provisional application No. 61/779,703, filed on Mar. 13, 2013.

(51) Int. Cl.
*G02B 6/00*     (2006.01)
*H01R 13/72*     (2006.01)
*H04Q 1/02*     (2006.01)

(52) U.S. Cl.
CPC .............. *H01R 13/72* (2013.01); *H04Q 1/135* (2013.01); *Y10T 29/49815* (2015.01)

(58) Field of Classification Search
CPC .... H01R 13/72; H04Q 1/135; Y10T 29/49815
See application file for complete search history.

(56) References Cited

U.S. PATENT DOCUMENTS

| 6,220,413 B1* | 4/2001 | Walters ............... G02B 6/4457 |
| | | 191/12.4 |
| 7,756,379 B2 | 7/2010 | Kowalczyk et al. |
| 8,189,984 B2 | 5/2012 | Kowalczyk et al. |
| 8,422,847 B2 | 4/2013 | Kowalczyk et al. |

(Continued)

FOREIGN PATENT DOCUMENTS

| JP | 2001-230564 | 8/2001 |
| KR | 20-2008-0003984 | 9/2008 |

(Continued)

OTHER PUBLICATIONS

European Search Report for Application No. 14778425.0 dated Oct. 7, 2016.

(Continued)

*Primary Examiner* — Ellen E Kim
(74) *Attorney, Agent, or Firm* — Merchant & Gould P.C.

(57) ABSTRACT

A telecommunications assembly includes a tray assembly including a tray and a cable spool assembly rotatably mounted to the tray, a connector holder arrangement for temporarily holding connectors, wherein the connector holder arrangement is mounted for rotation with the cable spool assembly, and cable storage arrangements for individually storing cables from the cable spool assembly to the connector holder arrangement. After a main cable is unwound from the cable spool assembly, a connector can be removed from the connector holder assembly, and cable slack stored in the cable storage arrangement can be removed allowing connection of the connector to equipment.

20 Claims, 7 Drawing Sheets

(56) References Cited

U.S. PATENT DOCUMENTS

| | | |
|---|---|---|
| 8,565,572 B2 | 10/2013 | Krampotich et al. |
| 8,737,796 B2 | 5/2014 | Krampotich et al. |
| 8,798,429 B2 | 8/2014 | Kowalczyk et al. |
| 8,886,005 B2 * | 11/2014 | Subhash ............ G02B 6/3897 385/134 |
| 8,938,147 B2 | 1/2015 | Krampotich et al. |
| 9,036,974 B2 | 5/2015 | LeBlanc et al. |
| 9,063,316 B2 * | 6/2015 | Loeffelholz .......... G02B 6/4441 |
| 9,223,106 B2 | 12/2015 | Coan et al. |
| 9,494,757 B2 | 11/2016 | Schomisch et al. |
| 9,664,871 B1 | 5/2017 | Galvan Mijangos et al. |
| 10,276,990 B2 | 4/2019 | Thompson |
| 2006/0228086 A1 | 10/2006 | Holmberg et al. |
| 2007/0036506 A1 | 2/2007 | Kewitsch |
| 2008/0239693 A1 * | 10/2008 | Hendrix ............. H05K 7/20563 361/826 |
| 2009/0074370 A1 | 3/2009 | Kowalczyk et al. |
| 2009/0324189 A1 | 12/2009 | Hill et al. |
| 2010/0329621 A1 | 12/2010 | Makrides-Saravanos et al. |
| 2011/0024543 A1 | 2/2011 | Smrha |
| 2011/0044599 A1 | 2/2011 | Kowalczyk et al. |
| 2011/0317974 A1 | 12/2011 | Krampotich et al. |
| 2013/0094828 A1 | 4/2013 | Loeffelholz et al. |
| 2013/0284843 A1 | 10/2013 | Mertesdorf |
| 2013/0284844 A1 | 10/2013 | Holmberg et al. |
| 2013/0287359 A1 | 10/2013 | Haataja |
| 2013/0306780 A1 | 11/2013 | Marcouiller et al. |
| 2015/0055925 A1 | 2/2015 | Kowalczyk et al. |

FOREIGN PATENT DOCUMENTS

| | | |
|---|---|---|
| WO | 2011/156969 A1 | 12/2011 |
| WO | 2015/073299 A1 | 5/2015 |

OTHER PUBLICATIONS

International Search Report and Written Opinion for PCT/US2014/022744 dated Jul. 28, 2014.

* cited by examiner

FIG. 7
FIG. 8
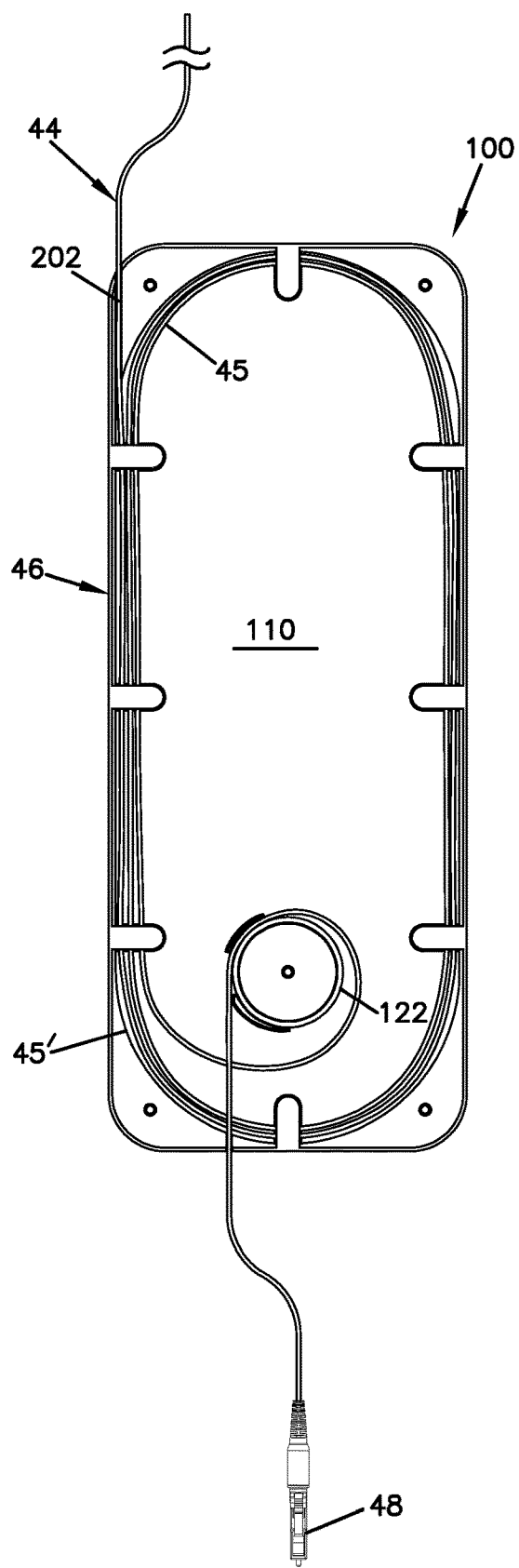
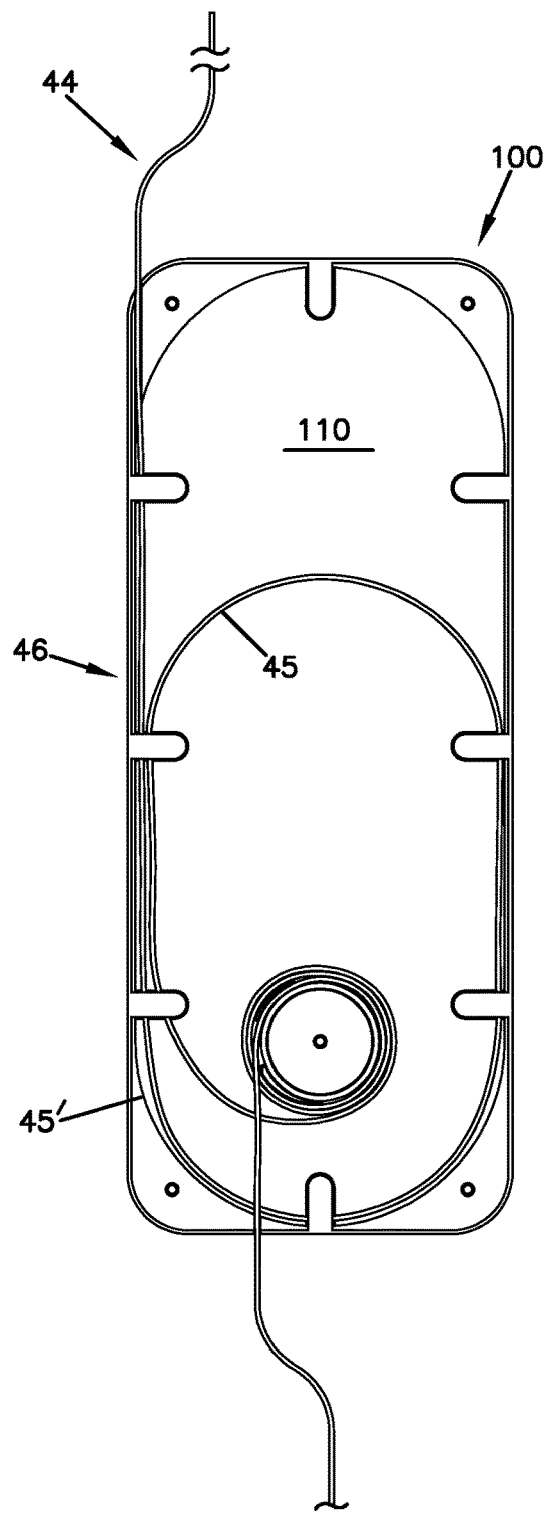

TELECOMMUNICATIONS ASSEMBLY WITH PATCH CORD STORAGE

CROSS REFERENCE TO RELATED APPLICATIONS

This application is a continuation of application Ser. No. 14/201,147, filed Mar. 7, 2014, now U.S. Pat. No. 10,276,990, which application claims the benefit of provisional application Ser. No. 61/779,703, filed Mar. 13, 2013, which applications are incorporated herein by reference in their entirety.

FIELD

The inventive aspects of this disclosure pertain to devices and methods for deploying, routing, housing, storing, shipping, connecting, and managing telecommunications cable and connections.

BACKGROUND

Telecommunication cabling systems typically include cabinets that house terminations and connections/interconnections of telecommunication cables. The telecommunication cables can include electrical cables, fiber optic cables, and/or hybrid cables that include both electrical and optical conductors. The cabinets typically allow terminations of the various cables to be connected, disconnected, and/or reconnected to other terminations of the various cables. In this way, the routing of signals across a telecommunications network can be configured and reconfigured as desired. For example, a trunk cable from a main office of a telecommunications provider or a data center may be branched to various branch cables at the cabinet. Each of the branch cables may then be routed to an end-user or to another cabinet.

The telecommunications cable can be stored on, delivered on, and deployed by spools. The cable is typically wound on the spool at a factory that produced the cable. Upon delivery to an installation site, the cable can be unwound from the spool and deployed. The cabinet can hold terminations/connectors of the cables that are routed to it.

SUMMARY

An aspect of the present disclosure relates to a telecommunications assembly including a tray assembly including a tray and a cable spool assembly rotatably mounted to the tray. A cable holder arrangement temporarily holds connectors wherein the connector holder arrangement is mounted for rotation with the cable spool assembly. Cable storage arrangements are provided for individually storing cables from the cable spool assembly to the connector holder arrangement.

An aspect of the present disclosure also relates to a method of deploying telecommunications cable comprising providing a telecommunications assembly including a tray assembly and a connector holder arrangement for holding connectors. The tray assembly includes a tray and a cable spool assembly rotatably mounted to the tray. The connector holder arrangement is mounted for rotation with the cable spool assembly. A cable storage arrangement for individually storing cables from the cable spool assembly to the connector holder arrangement also is mounted to the cable spool assembly. The method also includes unwinding a main cable from the cable spool assembly, removing a connector from the connector holder assembly after the main cable is unwound, and removing cable slack of a cable pigtail connected to the connector and the main cable from a cable storage arrangement after the main cable is unwound.

Aspects of the present disclosure allow for deployment of a main cable from a telecommunications assembly toward a first piece of telecommunications equipment desired for connection to the main cable. At the telecommunications assembly, the main cable can be broken out or fanned out into individual single fiber or multi-fiber cables. These cables can include connectorized ends which are stored on the telecommunications assembly until desired for use. Cable slack is also stored on the telecommunications assembly until desired for use. At the desired time, a connector and the necessary cable slack is removed from the telecommunications assembly and connected to another piece of telecommunications equipment, thereby connecting two pieces of equipment with an intermediate telecommunications assembly.

Features of the present disclosure allow for deployment of a cable in a first direction away from the telecommunications assembly, and deployment of a secondary cable or cables toward different equipment at the desired time for connection of the equipment. The present disclosure allows for storage of slack before and, if necessary, after deployment of the individual cables from the telecommunications assembly. Features of the present disclosure allow for deployment of only a desired length of the secondary cable or cables. Remaining slack length can remain stored and protected by the telecommunications assembly. In certain implementations, the telecommunications assembly is configured to enable the deployed length of the secondary cable or cables to be rewound/taken back into the telecommunications assembly for storage.

The telecommunications assembly of the present disclosure provides a solution which eliminates separate patch cords including connectorized opposite ends for connecting a telecommunications assembly with a main spool to other equipment.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 7 is a top plan view of the cassette of FIG. 5 with the cover removed so that an initial amount of slack length of the patch cord is visible stored within the cassette; and FIG. 8 is a top plan view of the cassette of FIG. 7 with part of the initial amount of slack length paid-out from the cassette.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

In general, the present disclosure enables deployment of a primary cable (e.g., an optical fiber cable) in a first direction away from a telecommunications assembly, and deployment of one or more secondary cables toward different equipment for connection of the equipment. The secondary cable or cables can be deployed before or after deployment of the primary cable. The telecommunications assembly is configured to store and protect any slack (i.e., undeployed) length of the primary and/or secondary cables. In certain implementations, the primary and/or secondary cables can be returned within the telecommunications assembly for storage when not in use.

Figure 1:
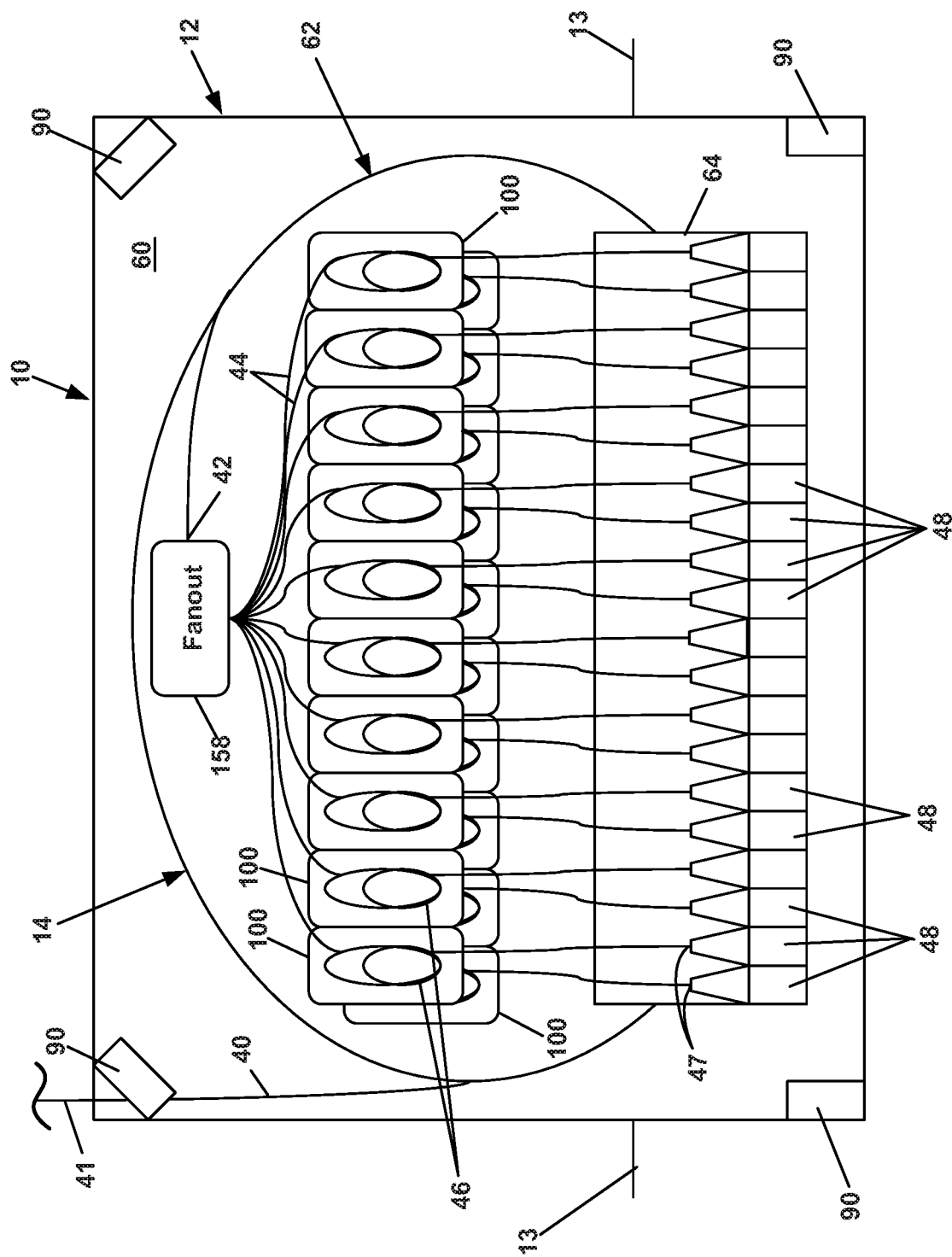
FIG. 1 is a schematic diagram of a telecommunications assembly having exemplary features of aspects of the present disclosure including a main cable deployment feature and fanout cable deployment features.

Referring now to FIG. 1, a schematic diagram of an example telecommunications assembly 10 having patch cord storage is shown. The telecommunications assembly 10 includes a chassis 12 (e.g., an enclosure, a case, etc.) and a tray assembly 14 (e.g., a shelf assembly, a drawer assembly, etc.) that removably mounts in the chassis 12. The telecommunications assembly 10 is adapted for mounting to a telecommunications rack. For example, brackets of flanges 13 can extend outwardly from the chassis 12 to secure to the rack (e.g., see FIG. 2).

The tray assembly 14 includes a tray 60 (e.g., a shelf, a drawer, etc.) and a cable spool assembly 62 rotatably mounted to the tray 60. The tray assembly 14 is adapted for insertion and removal from the chassis 12 as a unit without requiring the cable spool assembly 62 to be detached from the tray 60. The cable spool assembly 62 is adapted to rotate relative to the tray 60. A cable 40 (e.g., an optical cable including one or more optical fibers) can be wound around the cable spool assembly 62. In one example, the cable 40 is a micro-cable. A first end 41 of the cable 40 can be deployed from the chassis 12 by pulling on the first end 41, thereby rotating the cable spool assembly 62 relative to the tray 60.

A second end 42 of the cable 40 is optically coupled to one or more patch cords 44. In some implementations, each patch cord 44 is at least six feet long. In certain implementations, each patch cord 44 is at least eight feet long. In certain implementations, each patch cord 44 is at least ten feet long. In certain implementations, each patch cord 44 is at least twenty feet long. In other implementations, the patch cord 44 can be any desired length. In some implementations, the patch cords 44 are formed from fiber cable having an outer diameter of about 1.2 mm. In other implementations, the patch cords 44 can be formed from any desired type and size of fiber cable.

Each patch cord 44 has a distal end 47 terminated by an optical connector 48 (e.g., an SC-type connector, an LC-type connector, and LX.5-type connector, an MPO-type connector, etc.). The terminated ends 47 of the patch cords 44 are temporarily stored at the cable spool assembly 62 so that the terminated ends 47 rotate unitarily with the cable spool assembly 62 when the first end 41 of the cable 40 is deployed. For example, the connectors 48 can be mounted to a connector holder arrangement 64 of the cable spool assembly 62. The patch cords 44 can be deployed from the chassis 12 as needed by accessing the terminated end 47 of a desired patch cord 44 and pulling the terminated end 47 away from the chassis 12. Connector holder arrangement 64 can include clips or other devices for holding one or more of the connectors 48, connector boots 49, or the cables 44.

Slack length 46 of the patch cords 44 is stored at one or more cassettes 100. The cassettes 100 are mounted to the cable spool assembly 62 and rotate unitarily with the cable spool assembly 62 when the first end 41 of the cable 40 is deployed. For example, the slack length 46 of each patch cord 44 may be stored in one or more loops within a corresponding cassette 100. The loops are reduced in length (i.e., circumference) as the slack length 46 is paid out from the cassette 100, thereby allowing the patch cord connectors 48 to be paid out from the chassis 12. The cable spool assembly 62 does not rotate when one or more of the patch cords 44 are deployed from the chassis 12.

The telecommunications assembly 10 allows for storage of slack before and, if necessary, after deployment of the individual cables 40, 44 from the telecommunications assembly. In accordance with certain aspects of the disclosure, only a desired amount of cable 40 need be deployed from the telecommunications assembly 10. A remainder of the cable 40 can be stored and protected on the cable spool assembly 62. In accordance with certain aspects of the disclosure, only a desired amount of one or more of the patch cords 44 need be deployed from the telecommunications assembly 10. A remainder of each patch cord 44 can be stored and protected at the respective cassette 100. For example, in one implementation, the cassette 100 may hold about 10 feet of a patch cord 44. If a user only needs about 6.5 feet deployed, then the cassette 100 will continue to hold and protect about 3.5 feet of the patch cord 44.

Figure 2:
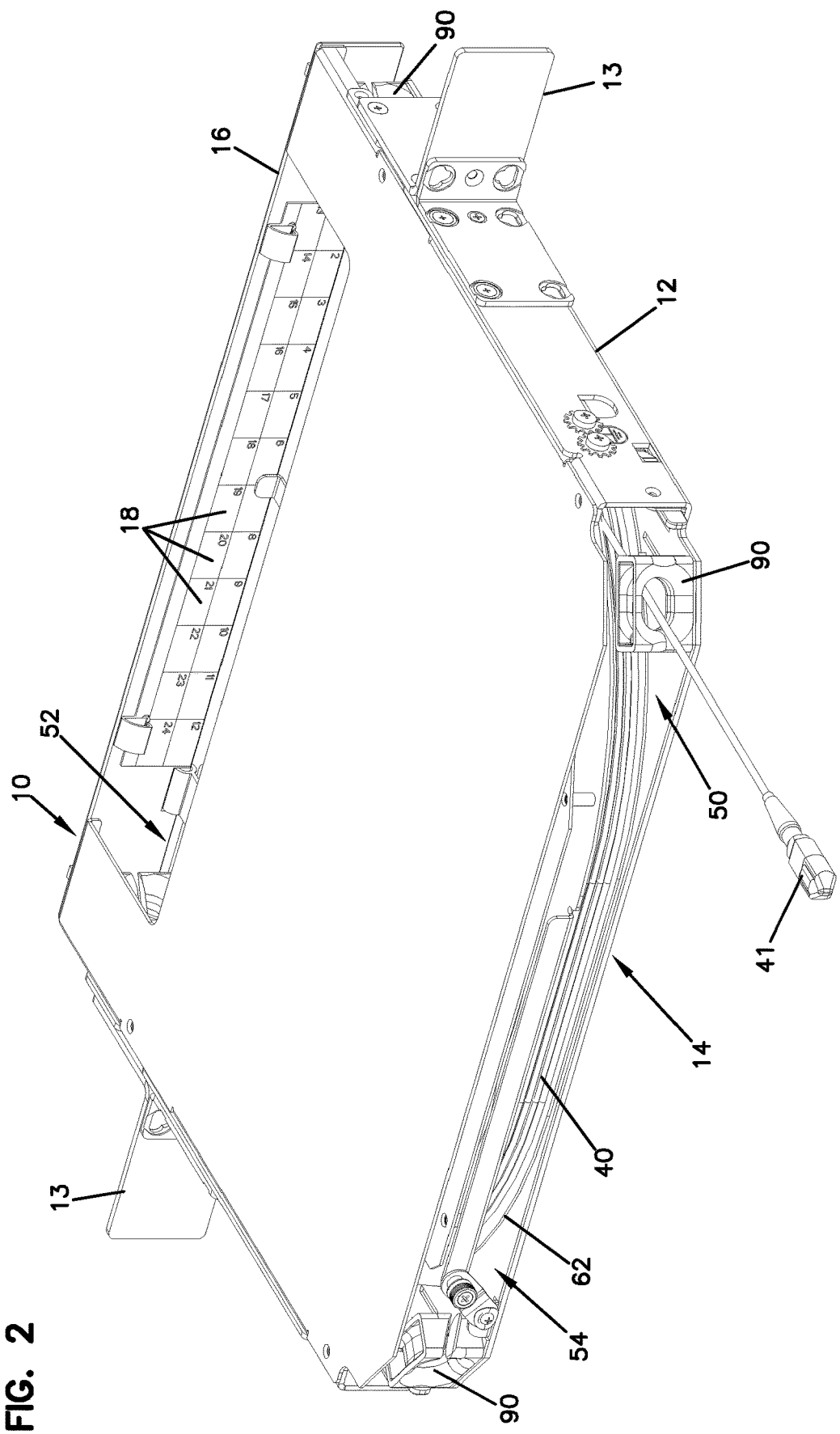
FIG. 2 is a perspective view of a telecommunications assembly having exemplary features of aspects in accordance with the principles of the present disclosure.
Figure 3:
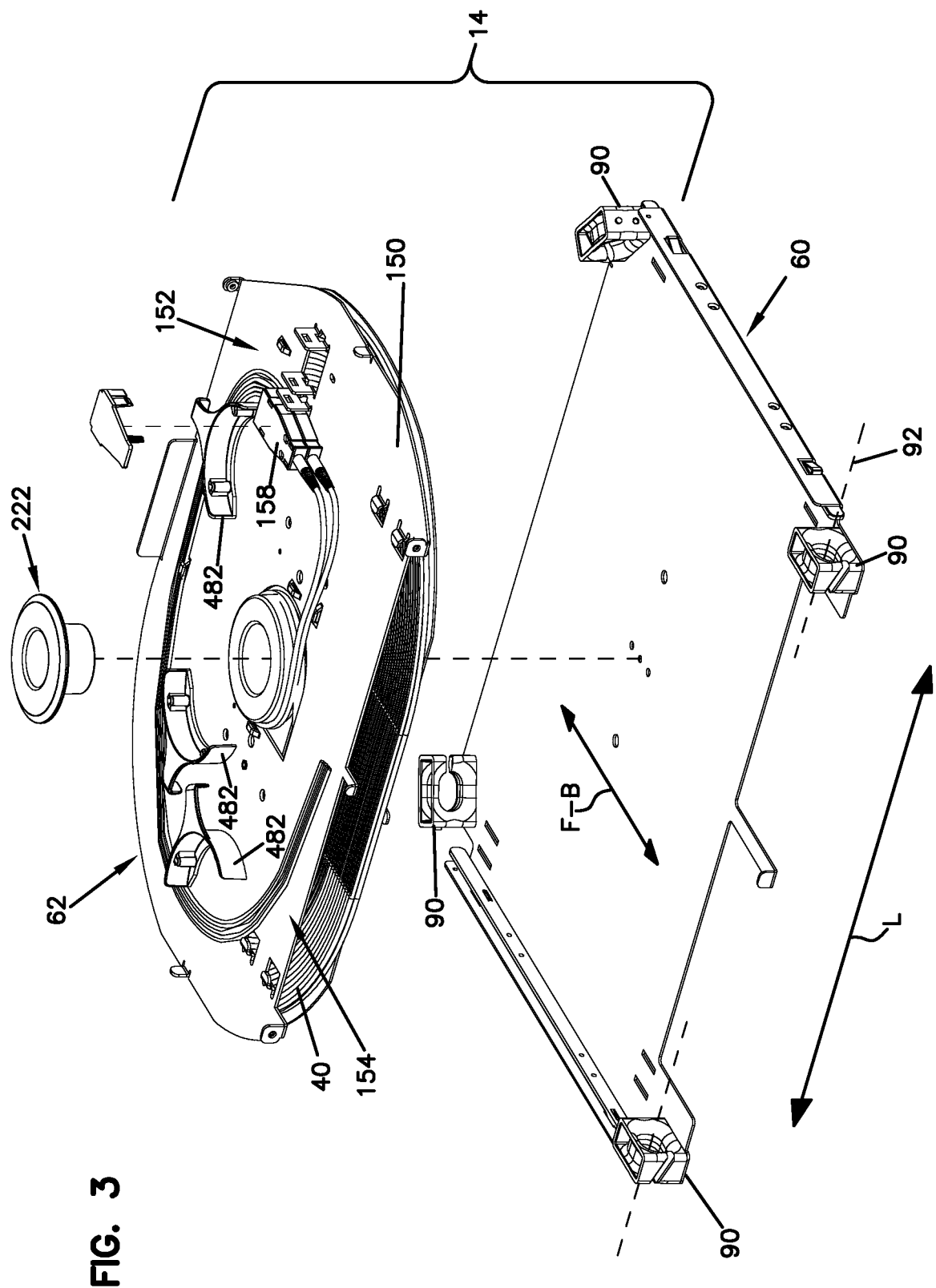
FIG. 3 is an exploded perspective view of a tray assembly suitable for use with the telecommunications assembly of FIG. 2.
Figure 4:
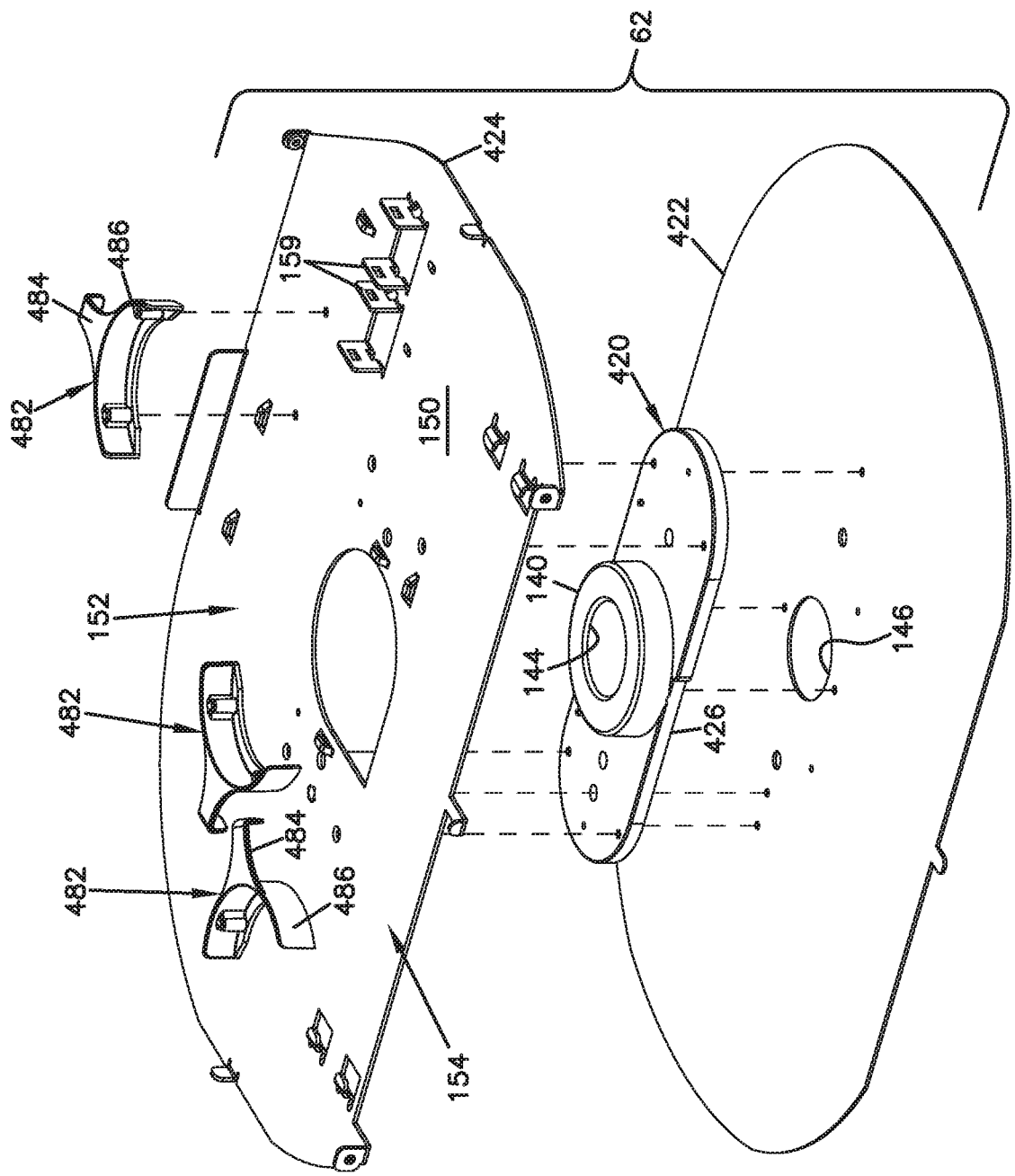
FIG. 4 is an exploded view of a cable spool assembly suitable for use with the tray assembly of FIG. 3.

FIGS. 2-4 illustrate one example implementation of a chassis 12 and tray assembly 14. In the depicted embodiment, the chassis 12 is generally rectangular in shape (see FIG. 2). The chassis 12 defines an interior region 50. The interior region 50 is adapted to receive the tray assembly 14. The chassis 12 defines a first opening 52 that provides access to the interior region 50. In the depicted embodiment, the first opening 52 is a front opening to the interior region 50. The chassis 12 also defines a second opening 54 that provides access to the interior region 50. In the depicted embodiment, the second opening 54 is a rear opening to the interior region 50.

In certain embodiments, the telecommunications assembly 10 includes a front cover plate 16. In the depicted example, the front cover plate 16 is hingedly engaged to the chassis 12. The front cover plate 16 is adapted to pivot between an open position and a closed position (shown at FIG. 2). As depicted, when in the closed position, the front cover plate 16 extends over and substantially covers the first opening 52. The front cover plate 16 can be held in the closed position by latches or other such fastening structures.

The front cover plate 16 can include labels 18. The labels 18 can be associated with individual patch cords 44 or patch cord connectors 48. As depicted, the labels 18 can be viewed when the front cover plate 16 is in the open position.

FIG. 3 illustrates one example implementation of a tray assembly 14 suitable for use in the chassis 12 of FIG. 2. The tray 60 of the tray assembly 14 includes a plurality of bend radius protectors 90. When the first end 41 of the cable 40 is deployed from the chassis 12, the first end 41 is routed through any one of the bend radius protectors 90 disposed on the tray 60. Each bend radius protector 90 defines a passage including a first arcuate edge and a second arcuate edge. Each of the first and second arcuate edges defines a radius that is greater than the minimum bend radius of a fiber optic cable 40 that passes through the passage so as to reduce the risk of attenuation damage to the fiber optic cable.

At least one of the bend radius protectors 90 is disposed adjacent to the first opening 52 in the chassis 12 and at least another of the bend radius protectors 90 is disposed adjacent to the second opening 54 in the chassis 12. In the depicted embodiment of FIG. 3, the bend radius protectors 90 disposed at the first opening 52 are oriented so that central axes 92 of the bend radius protectors 90 are aligned. For example, the central axes 92 can be parallel to a lateral direction L. In the depicted embodiment of FIG. 3, the bend radius protectors 90 disposed at the second opening 54 are oriented so that the central axes 92 of the bend radius protectors 90 are angled outwardly from the chassis interior 50. The central axes 92 of these bend radius protectors 90 are disposed at oblique angles relative to the lateral direction L and to a front-to-back direction F-B.

FIG. 4 illustrates one example implementation of a cable spool assembly 62 suitable for mounting to the tray 60. The cable spool assembly 62 includes a hub 420, a first flange 422 engaged to the hub 420, and a second flange 424 engaged to the hub 420 opposite the first flange 422 (see FIG. 4). The cable 40 is wound around the hub 420 between the flanges 422, 424 for storage on the cable spool assembly 62. The second flange 424 includes an outer surface 150. The outer surface 150 includes a cable management area 152 and a termination area 154 disposed adjacent to the cable management area 152. The second end 42 of the cable 40 is routed through the second flange 424 to the cable management area 152.

One or more cable fanouts 158 (FIG. 3) can be mounted at the cable management area 152 (e.g., at fanout brackets 159). The fanouts 158 separate out individual optical fibers of the cable 40 to form one or more patch cords 44. In certain implementations, the fanouts 158 upjacket the patch cords 44. The terminated ends of the patch cords 44 are temporarily stored at the termination area 154 of the second flange 424. For example, one or more connector holders 64 can be mounted to the termination area 154. The connector holder 64 is structured to hold one or more of the patch cord connectors 48 so that the connectors 48 can be pulled out through the first opening 52 in the chassis 12.

The cable management area 152 also includes a plurality of bend radius protectors 482. The bend radius protectors 482 are disposed on the outer surface 150 of the second flange 424. The bend radius protectors 482 are adapted to prevent damage to the optical fibers that are routed from the fanout 158 to the termination area 154. In the depicted embodiment, each of the bend radius protectors 482 is arcuate in shape and includes a retention projection 484 that extends outwardly from a convex surface 486 of the bend radius protector 482.

In the depicted embodiment, a body 426 of the hub 420 is generally oval in shape. The oval shape of the body 426 of the hub 420 allows for a greater length of fiber optic cable 40 to be coiled around the body 426 for a given depth and width of the cable spool assembly 62. However, it will be understood that the scope of the present disclosure is not limited to the body 426 of the hub 420 being oval in shape. The body 426 of the hub 420 can have various geometric shapes (e.g., circular, obround, etc.). The body 426 of the hub 420 includes a strain relief protrusion 140.

The first flange 422 is engaged to the hub 420. In the subject embodiment, the first flange 422 is fastened (e.g., screwed, bolted, riveted, welded, bonded, etc.) to the first surface 428 of the hub 420. The first flange 422 is generally planar and oval in shape. The first flange 422 defines a bore 146 that is adapted for alignment with the central bore 144 of the hub 420 when the first flange 422 is engaged to the hub 420.

The second flange 424 is engaged to the hub 420. In the depicted embodiment, the second flange 424 is fastened (e.g., screwed, bolted, riveted, welded, bonded, etc.) to the second surface 130 of the hub 420. The second flange 424 includes a central opening 148 that extends through the second flange 424. The central opening 148 is adapted to receive the strain relief protrusion 140 of the hub 420 when the second flange 424 is engaged to the hub 420 so that the strain relief protrusion 140 extends outwardly from the second flange 424 of the cable spool assembly 62. In the depicted embodiment, the central opening 148 is oversized to allow the fiber optic cable 40 to pass through the central opening 148 (see FIG. 3).

The cable spool assembly 62 is rotatably engaged to the tray 60 by a bushing 222. The bushing 222 is generally cylindrical in shape. The bushing 222 is sized to extend through the strain relief protrusion 140 of the hub 420 and to fixedly secure (e.g., via fastener or keying arrangement) to the tray 60 (e.g., see FIG. 3). As the bushing 222 is generally cylindrical in shape, the cable spool assembly 62 can rotate about the bushing 222. In certain implementations, a locking arrangement can selectively inhibit rotational movement between the cable spool assembly 62 and the tray 60. For example, the locking arrangement can be released to deploy the first end 41 of the cable 40 and can be locked when or after deploying the patch cords 44.

Additional details regarding one example telecommunications assembly 10 are provided in U.S. Publication Nos. 2011/0317974 and 2011/0044599, the disclosures of which are hereby incorporated herein by reference.

Figure 5:
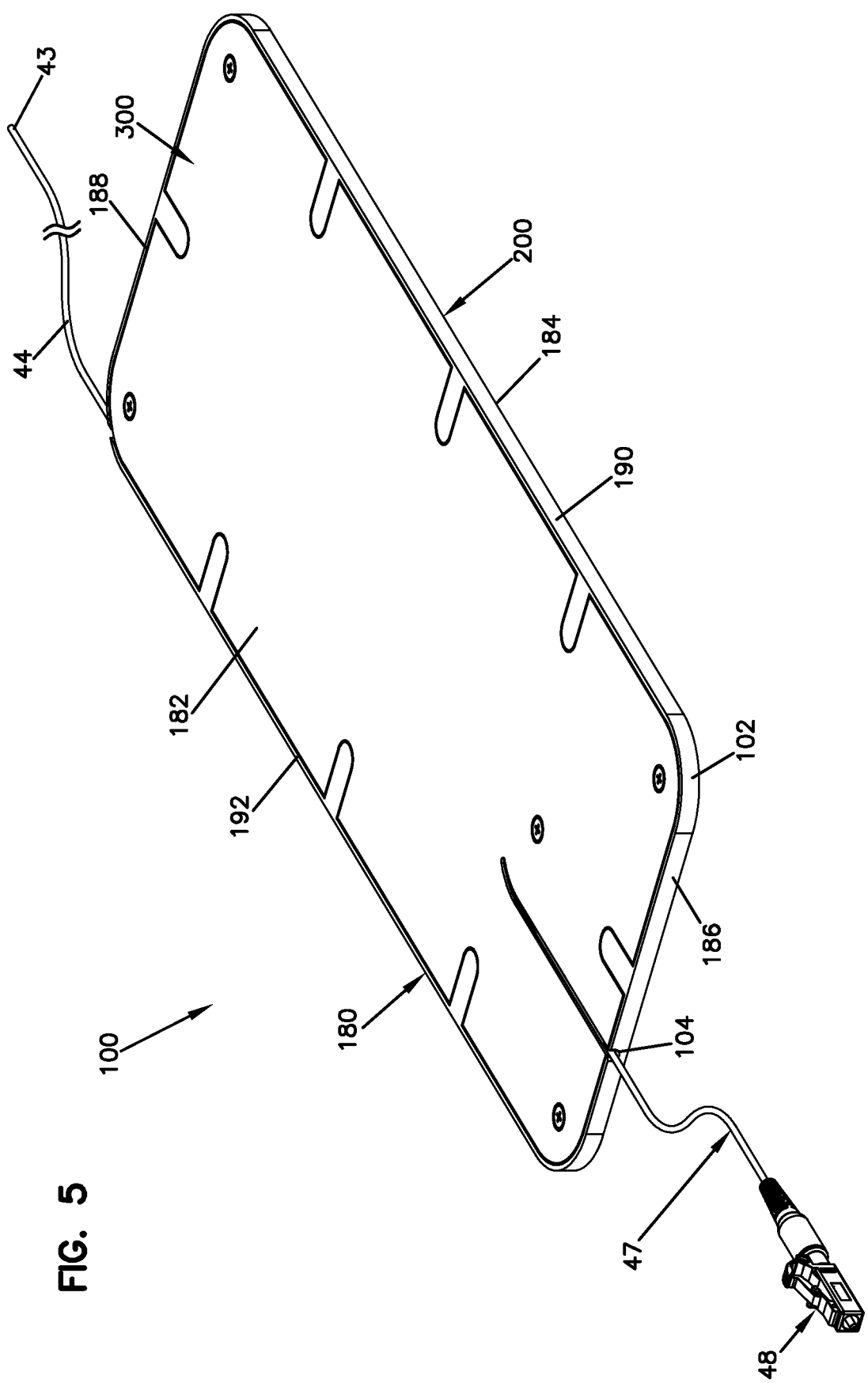
FIG. 5 is a perspective view of a payout cassette according to the principles of the present disclosure, the payout cassette storing a stored portion of a patch cord and paying out excess length of the patch cord.
Figure 6:
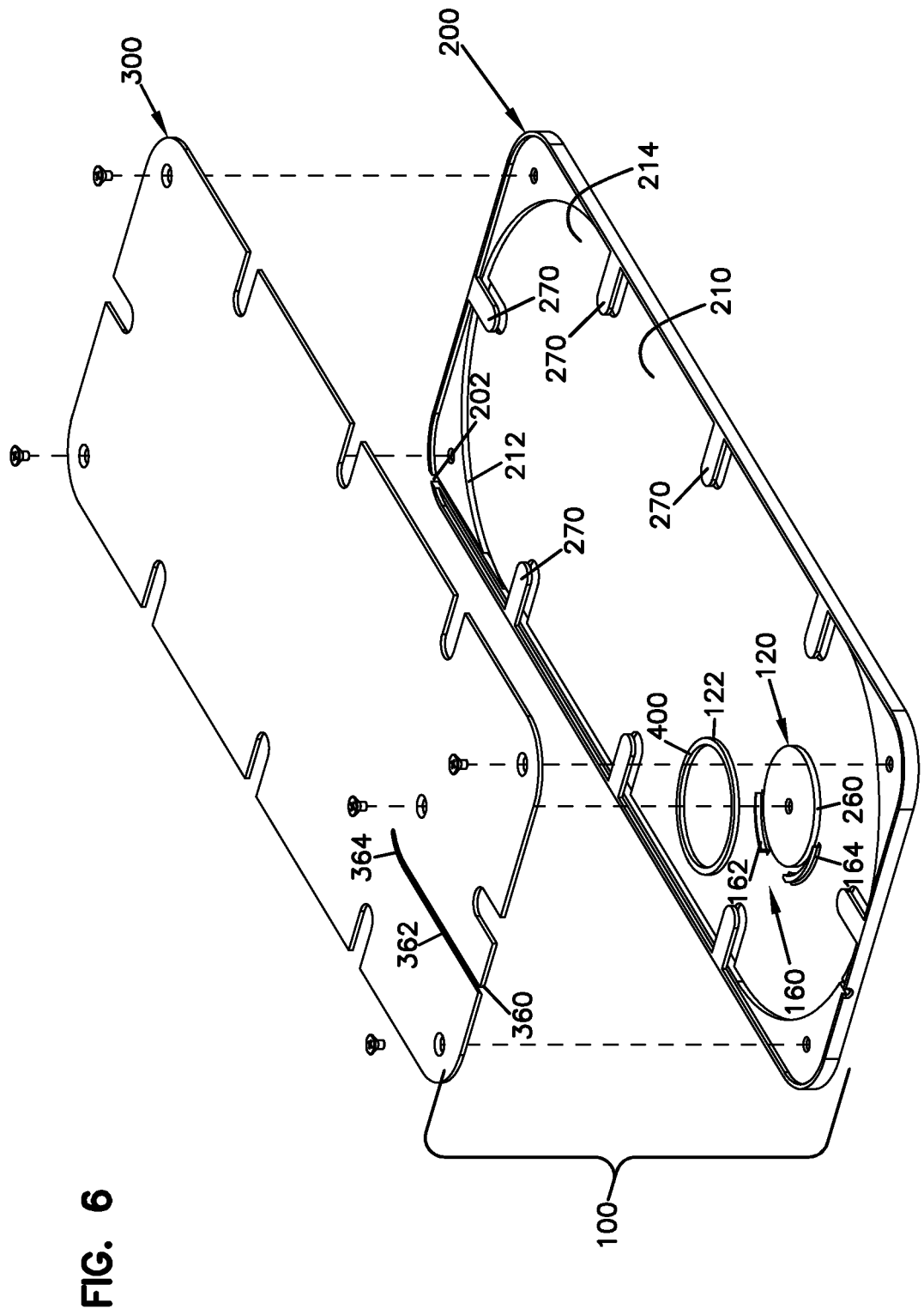
FIG. 6 is the perspective view of the payout cassette of FIG. 5, but without the patch cord and with a cover and an anti-friction device of the cassette exploded away from a base portion of the cassette.

Referring now to FIGS. 5-7, an example cassette 100 for paying-out an example patch cord 44 is shown. The cassette 100 is configured to enable a user to pay-out the excess length 46 of the patch cord 44 from the cassette 100. In particular, a paid-out end 47 (i.e., and the terminating connector 48) of the patch cord 44 can be pulled from the cassette 100 at various lengths to bring the paid-out end 47 of the patch cord 44 to a desired location (e.g., to a user termination port, to a piece of telecommunications equipment, etc.).

As depicted, the cassette 100 does not require a rotary union or substantial accumulated twist in the patch cord 44. Rather, loops 45 of the slack length 46 of the patch cord 44 within a storage area 110 of the cassette 100 are reduced in length (i.e., circumference) while the patch cord 44 is being paid-out from the cassette 100. In particular, the loops 45 of the excess length 46 of the patch cord 44 tighten around a wrapping surface 122 of a wrapping area 120 within a storage area 110 when the cassette assembly 100 pays-out the patch cord 44 (compare FIGS. 7 and 8). In other implementations, however, the cassette 100 can include rotational spools, ratcheting spools, or other take-up reels.

As illustrated at FIGS. 5 and 6, the cassette 100 includes a housing 180 that further includes a base portion 200 and a cover 300. The housing 180 extends between a first side 182 and a second side 184, a first end 186 and a second end 188, and a first edge 190 and a second edge 192. In the depicted example, a series of fingers 270 project inwardly from the sides, ends, and edges of the base portion 200 to keep the series of the loops 45 positioned at the one layer deep. The fingers 270 also may hold the cover 300 to the base portion 200.

The base portion 200 includes a cavity 210 defining an interior perimeter 212. The wrapping area 120 is located within the cavity 210. A second wrapping area 214 also is located within the cavity 210 and adjacent to the perimeter 212. A substantial majority of the patch cord 44 may be initially loaded in the second wrapping area 214 of the cavity 210 adjacent the perimeter 212 in a series of the loops 45 that are positioned within the cavity 210 one layer deep (see FIG. 7). An initial loop 45' (e.g., the outermost loop) may begin at a cable passage 202. The cable passage 202 may be adjacent the perimeter 212 and may extend between the cavity 210 and an exterior 102 of the cassette 100 (see FIGS. 5 and 6). The excess length 46 of the patch cord 44 may continue to be wrapped in loops 45 within the cavity 210.

As mentioned above, the patch cord 44 tightens around the wrapping surface 122 of the wrapping area 120 within the storage area 110 when the patch cord 44 is paid-out from the cassette 100. In certain implementations, the wrapping surface 122 is formed on the annular ring 400. By having the wrapping surface 122 formed on the annular ring 400, friction may be reduced. The annular ring 400 may be made of a low-friction material (e.g., Teflon®) and, thereby, be an anti-friction device. The annular ring 400 may be rotatably mounted to a mount 260 that is attached to or part of the housing 180 (e.g., the base portion 200). In certain embodiments, the mount 260 may be attached to or part of the cover 300.

The cassette 100 also includes a transitioning area 160 for transitioning the patch cord 44 from the storage area 110 to the exterior 102 of the cassette 100. As the patch cord 44 is paid-out of the storage area 110 of the cassette 100, the patch cord 44 within the storage area 110 generally transfers through the transitioning area 160 and on to the exterior 102 of the cassette 100 where it continues on toward a deployed area. The transitioning area 160 includes a first cable guide 162 and a second cable guide 164 adjacent the annular ring 400. In the depicted embodiment, the first and the second cable guides 162, 164 are formed on the base portion 200 of the cassette 100.

The first cable guide 162 is spaced away from the annular ring 400 and extends circumferentially around the annular ring 400 along an arc segment concentric with the annular ring 400. In the depicted embodiment, the first cable guide 162 is spaced from the annular ring 400 by a distance sufficient to route a single strand (e.g., loop 45) of the patch cord 44 between the first cable guide 162 and the annular ring 400. In the depicted embodiment, the second cable guide 164 is positioned immediately adjacent the annular ring 400. In the depicted embodiment, the second cable guide 164 may have a small clearance with the annular ring 400. The small clearance, as depicted, is not sufficient in size to receive a strand of the patch cord 44.

The cassette 100 also includes a third cable guide 360. As depicted, the third cable guide 360 is in the form of a slot (i.e., a slit). In the depicted embodiment, the slot extends through the cover 300 of the housing 180. In other embodiments, the third cable guide 360 may be formed as a channel and thereby may not necessarily extend through the cover 300. The third cable guide 360 includes a straight segment 362 and a curved segment 364 that is tangent to the straight segment 362. The curved segment 364 generally follows and continues along a path of the space between the first cable guide 162 and the annular ring 400.

As illustrated at FIGS. 5 and 6, when the cassette 100 is holding a maximum length of the patch cord 44 or near the maximum length of the patch cord 44, the outermost loops 45 follow the perimeter 212 of the storage cavity 210 as noted above. Upon a cable route reaching the innermost loop 45, the patch cord 44 departs from following the perimeter 212 and veers toward the annular ring 400. The patch cord 44 is routed between the first cable guide 162 and the annular ring 400 and then through the curved portion 364 of the third cable guide 360. Along the third cable guide 360, the patch cord 44 is elevated above the previous loops 45 and progressively is positioned at an elevation of the cover 300 within the third cable guide 360. The third cable guide 360 continues until it reaches an edge of the cover 300. The patch cord 44 follows the third cable guide 360 and continues past the edge of the cover 300 toward the exterior 102 of the cassette 100. The third cable guide 360 thereby forms at least a portion of an exit 104 for the patch cord 44 as it leaves (i.e., exits) the cassette 100.

As illustrated at FIGS. 7 and 8, upon the deployment of the patch cord 44, the loops 45 transition from being positioned adjacent the perimeter 212 to being positioned adjacent or partially adjacent to the annular ring 400. In particular, the innermost loop 45 draws the excess length 46 of the patch cord 44 from the second to the most innermost loop (loop 45 as depicted in FIG. 8) as the patch cord 44 is deployed from the cassette 100. As the second to the most innermost loop is drawn toward the rotating ring 400, it is positioned on an opposite side of the first cable guide 162 from the innermost loop 45. As the patch cord 44 continues to be deployed, portions of the patch cord 44 that were in the innermost loop 45 exit through the transition area 160 and toward the exterior 102 of the cassette 100.

The excess length 46 of the patch cord 44 that has left the innermost loop 45 is replaced by the excess length 46 that is drawn from the second to the most innermost loop. This results in the second to the most innermost loop becoming smaller and drawing material from the third to the most innermost loop. This process continues until all of the excess length 46 that was positioned at the perimeter 212 of the cavity 210 is now positioned adjacent the rotating ring 400 and/or has exited the cassette 100. The number N of loops 45 of the patch cord 44 within the storage area 110 may remain constant during the cable deployment process. The length of each loop 45 is decreased in magnitude (i.e., circumference) thereby supplying the excess length 46 of the patch cord 44 that is deployed.

Additional details regarding one example cassette 100 suitable for use with the cable spool assembly 62 are provided in U.S. Provisional Application No. 61/640,422, filed Apr. 30, 2012, and titled "Cable Payout Cassette with Single Layer Cable Storage Area," the disclosure of which is hereby incorporated herein by reference.

In certain implementations, the cassette 100 can be configured to retract or otherwise receive the slack length of the patch cord 44 back inside the cassette 100. For example, in some implementations, the slack may be manually threaded back into the cassette 100. In other implementations, the cassette 100 can include a ratcheted or geared mechanism for winding the slack back into the cassette 100.

Suitable implementations of such a cassette 100 are disclosed in U.S. Provisional Application No. 61/640,410, filed Apr. 30, 2012, and titled "Guided Cable Storage Assembly with Switchbacks;" U.S. Provisional Application No. 61/640,435, filed Apr. 30, 2012, and titled "Payout Spool with Automatic Cable Disconnect/Reconnect;" U.S. Provisional Application No. 61/640,449, filed Apr. 30, 2012, and titled "Cable Storage Spool with Center Feed;" and U.S. Publication No. 2011/0024543, the disclosures of which are all hereby incorporated herein by reference.

Referring back to FIG. 1, one or more of the cassettes 100 can be mounted to the termination region 154 of the cable spool assembly 62. First ends 43 of the patch cords 44 extend out of the fanouts 158 at the cable management region 152 of the cable spool assembly 62 and are routed to the cassettes 100. As shown, two or more cassettes 100 may be stacked to form two or more rows at the cable management region 152. For example, the first side 182 of a first cassette 100 may be placed adjacent to the second side 184 of a second cassette 100. Other positions of the cassettes 100 can be provided, as desired.

The slack length 46 of the patch cords 44 is stored within the cassettes 100, e.g., as detailed above. The distal ends 47 of the patch cords 44 extend outwardly from the cassettes 100 to the one or more connector holders 64 on the cable spool assembly 62. The patch cord connectors 48 are stored at the connector holder 64. The fanouts 158, cassettes 100, and connectors 48 all rotate in unison with the cable spool assembly 62 when the first end 41 of the cable 40 is deployed from the chassis 12.

When the first end 41 of the cable 40 is sufficiently paid-out, the cable spool assembly 62 can be rotationally locked or otherwise inhibited from rotating. A user can selectively pay-out one or more of the patch cords 44 from their respective cassettes 100 as desired. For example, the user may grab the connector 48 associated with one of the patch cords 44, remove the connector 48 from the connector holder 64, and pull the connector 48 away from the cassette 100. In an example, the user pulls the connector 48 out of the chassis 12 through the first opening 52 of the chassis 12. The connector 48 can be routed and plugged into any desired port to connect to an end user (or other equipment) to an optical network.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A telecommunications assembly comprising:
    a cable spool including a flange extending radially outwardly from an axial end of a drum;
    a cable wound around the drum of the cable spool, the cable extending between a first end and a second end, the first end of the cable being terminated at a plug connector, the second end of the cable including a plurality of connectorized pigtails;
    a connector holder arrangement carried with the cable spool during rotation of the cable spool when the cable is deployed from the cable spool, the connector holder arrangement configured to temporarily hold plug connectors terminating the connectorized pigtails at the second end of the cable; and
    a plurality of cassettes carried by the cable spool during rotation of the cable spool when the cable is deployed from the cable spool, each cassette holding slack length of a respective one of the connectorized pigtails.

2. The telecommunications assembly of claim 1, wherein the cable is an optical cable including a plurality of optical fibers.

3. The telecommunications assembly of claim 2, further comprising a fanout arrangement carried with the cable spool during rotation of the cable spool when the cable is deployed from the cable spool, the fanout arrangement separating the optical fibers of the optical cable into the connectorized pigtails.

4. The telecommunications assembly of claim 3, wherein the cassettes are disposed between the fanout arrangement and the connector holder arrangement.

5. The telecommunications assembly of claim 1, further comprising a cable management region carried with the cable spool during rotation of the cable spool when the cable is deployed from the cable spool, the cable management region configured to inhibit excessive bending of the connectorized pigtails routed from the cable management region.

6. The telecommunications assembly of claim 5, wherein the cassettes are disposed between the cable management region and the connector holder arrangement.

7. The telecommunications assembly of claim 1, wherein each cassette is configured to hold the respective slack length in loops within the cassette.

8. The telecommunications assembly of claim 7, wherein each cassette is configured so that the loops are reduced in circumference as the slack length is paid out from the cassette.

9. The telecommunications assembly of claim 7, wherein the loops are held one layer deep within each cassette.

10. The telecommunications assembly of claim 1, wherein each cassette is configured to hold about 10 feet of the respective connectorized pigtail.

11. The telecommunications assembly of claim 1, wherein each cassette is configured to hold about 3.5 feet of the respective connectorized pigtail.

12. The telecommunications assembly of claim 1, wherein the cable spool is disposed within a housing.

13. The telecommunications assembly of claim 12, wherein the cable spool is mounted to a tray that is movable relative to the housing.

14. The telecommunications assembly of claim 12, wherein the housing defines an open front.

15. The telecommunications assembly of claim 14, wherein the housing defines an open rear.

16. The telecommunications assembly of claim 1, wherein the flange is a first flange and the axial end of the drum is a first axial end, and wherein the cable spool includes a second flange at a second axial end of the drum, the second axial end being opposite the first axial end.

17. The telecommunications assembly of claim 1, wherein the cassettes do not include rotary unions.

18. The telecommunications assembly of claim 1, wherein the cassettes include rotational spools.

19. The telecommunications assembly of claim 1, wherein the cassettes include ratcheting spools.

20. The telecommunications assembly of claim 1, wherein the cassettes each include a base and a cover that cooperate to define an interior.

* * * * *